United States Patent [19]

Okamoto et al.

[11] Patent Number: 4,981,918

[45] Date of Patent: Jan. 1, 1991

[54] CROSSLINKABLE, FLUORINE-CONTAINING ELASTOMER COMPOSITION

[75] Inventors: Shin Okamoto, Kawasaki; Masatoshi Abe, Kitaibaraki, both of Japan

[73] Assignee: Nippon Mektron Limited, Tokyo, Japan

[21] Appl. No.: 377,097

[22] Filed: Jul. 10, 1989

[30] Foreign Application Priority Data

Aug. 3, 1988 [JP] Japan .................................. 63-19766

[51] Int. Cl.$^5$ ................................................ C08F 8/00
[52] U.S. Cl. .................................. 525/387; 525/326.3
[58] Field of Search .............................. 525/326.3, 387

[56] References Cited

U.S. PATENT DOCUMENTS

| 3,306,879 | 2/1967 | Pattison | 525/326.3 |
| 4,708,988 | 11/1987 | Tabb | 525/326.3 |
| 4,831,085 | 5/1989 | Okabe et al. | 525/326.3 |

*Primary Examiner*—Bernard Lipman
*Attorney, Agent, or Firm*—Fred Philpitt

[57] ABSTRACT

A crosslinkable, fluorine-containing elastomer composition containing an organic peroxide having a peroxy group —O—O—C $(CH_3)_2$R, where R is a lower alkyl group, in the molecule and an activation energy of not more than 34.0 Kcal/mole as a crosslinking agent for a fluorine-containing elastomer containing at least one of iodine and bromine. The organic peroxide reduces an amount of $CH_3I$ or $CH_3Br$ to be generated at its decomposition.

5 Claims, No Drawings

CROSSLINKABLE, FLUORINE-CONTAINING ELASTOMER COMPOSITION

BACKGROUND OF THE INVENTION

1. Field of the Invention

This invention relates to a crosslinkable, fluorine-containing elastomer composition, and more particularly to a crosslinkable, fluorine-containing elastomer composition, which comprises a fluorine-containing elastomer containing at least one of iodine and bromine in the molecule and an organic peroxide.

2. Description of the Prior Art

Organic peroxide crosslinking of fluorine-containing elastomer has been regarded as more distinguished than the conventional crosslinking procedures such as polyol crosslinking, polyamine crosslinking, etc. because the organic peroxide crosslinked product has distinguished resistances to engine oil, solvent, etc.

As organic peroxide-crosslinkable, fluorine-containing elastomer, those containing both iodine and bromine, or iodine or bromine in the molecule have been proposed by the present applicants and others [U.S. Pat. No. 4,774,302; Japanese patent application Kokai (Laid-open) Nos. 62-232,407, 53-125, 491, 60-221, 409, 59-20, 310, 62-260, 807 and 63-308, 008; Japanese Patent Publication No. 54-1, 585, etc.].

However, an organic peroxide to be used for the crosslinking generates toxic compounds such as methyl iodide($CH_3I$) or methyl bromide($CH_3Br$) derived from the methyl group in the molecule when decomposed, thereby being about a problem that is hardly ignorable in the maintenance of working site or surrounding atmosphere.

SUMMARY OF THE INVENTION

An object of the present invention is to provide a crosslinkable, fluorine-containing elastomer composition which comprises a fluorine-containing elastomer containing at least one of iodine and bromine in the molecule and an organic peroxide, with less generation of $CH_3I$ or $CH_3Br$ when the organic peroxide is decomposed.

DETAILED DESCRIPTION OF PREFERRED EMBODIMENTS

The object of the present invention can be attained with a crosslinkable, fluorine-containing elastomer composition which comprises a fluorine-containing elastomer containing at least one of iodine and bromine in the molecule and an organic peroxide having a peroxide group represented by the general formula $-O-O-C(CH_3)_2R$, wherein R represents a lower alkyl group, in the molecule and having an activation energy of not more than 34.0 Kcal/mole.

Fluorine-containing olefins constituting the main part of a fluorine-containing elastomer containing at least one of iodine and bromine in the molecule for use in the present invention have preferably 2 to 8 carbon atoms and include, for example, vinylidene fluoride, tetrafluoroethylene, hexafluoropropene, pentafluoropropene, chlorotrifluoroethylene, methyl perfluorovinyl ether, ethyl perfluorovinyl ether, n- or iso-propyl perfluorovinyl ether, n-, iso- or tert-butyl perfluorovinyl ether, n- or iso-amyl perfluorovinyl ether, perfluoro(methyl vinyl ether), perfluoro(ethyl vinyl ether), perfluoro(n- or iso-propyl vinyl ether), perfluoro(n-, iso- or tert butyl vinyl ether), perfluoro(n- or iso-amyl vinyl ether), perfluoro(propoxypropyl vinyl ether), etc. at least one of which is mainly used. Besides the foregoing compounds, vinyl fluoride, trifluoroethylene, perfluorocyclobutene, perfluoro(methylcyclopropene), hexafluoroisobutene, 1,2,2-trifluorostylene, perfluorostyrene, etc. can be used.

These fluorine-containing olefins can be also copolymerized with at least one of olefinic compound having 2 to 6 carbon atoms and fluorine-containing dienes having 4 to 8 carbon atoms.

The olefinic compound has 2 to 6 carbon atoms and includes, for example, olefins such as ethylene, propylene, butene; unsaturated vinyl esters such as vinyl acetate, and alkyl vinyl ethers such as methyl vinyl ether, ethyl vinyl ether, and is generally copolymerized in a proportion of about 0.1 to about 50% by mole as contained in the fluorine-containing elastomer.

The fluorine-containing diene has 4 to 8 carbon atoms, and includes, for example, perfluoro-1,3-butadiene, perfluoro-1,4-pentadiene, 1,1,2-trifluoro-1,3-butadiene, 1,1,2-trifluoro-1,4-pentadiene, 1,1,2,3,3-pentafluoro-1,4-pentadiene, perfluoro-1,7-octadiene, perfluorodivinyl ether, perfluorovinyl perfluoroallyl ether, vinyl perfluoroallyl ether, perfluorovinyl vinyl ether, etc. It is preferable that the fluorine-containing diene is copolymerized in a proportion of not more than 1% by mole, as contained in the fluorine-containing elastomer. When copolymerized in a proportion above about 1% by mole, the copolymer elastomer undergoes considerable gelation, deteriorating the processability(flow characteristics) and the elongation of the vulcanized products.

Specific fluorine-containing olefin copolymers include, for example, hexafluoropropene-vinylidene fluoride copolymer, hexafluoropropene-vinylidene fluoride-tetrafluoroethylene terpolymer, tetrafluoroethylene-vinylidene fluoride-perfluoro(methyl vinyl ether) terpolymer, tetrafluoroethylene-vinylidene fluoride-perfluoro(propyl vinyl ether) terpolymer, tetrafluoroethylene-perfluoro(propoxypropyl vinyl ether) copolymer, tetrafluoroethylene-perfluoro(methyl vinyl ether) copolymer, tetrafluoroethylene-propylene copolymer, tetrafluoroethylene-vinylidene fluoride-hexafluoropropene-pentafluoropropene quaternary copolymer, tetrafluoroethylene-hexafluoropropene-vinylidene fluoride-perfluoro(methyl vinyl ether) quaternary copolymer, tetrafluoroethylene-hexafluoropropene-hexafluoroisobutene terpolymer, tetrafluoroethylene-cyclohexyl vinyl ether copolymer, hexafluoropropene-vinylidene fluoride-chlorotrifluoroethylene terpolymer, vinylidene fluoride-tetrafluoroethylene-methyl perfluorovinyl ether terpolymer, vinylidene fluoride-tetrafluoroethylene-n-butyl perfluorovinyl ether terpolymer, vinylidene fluoride-methyl perfluorovinyl ether-perfluoro(methyl vinyl ether) terpolymer, tetrafluoroethylene-methyl perfluorovinyl ether-perfluoro(methyl vinyl ether) terpolymer, vinylidene fluoride-hexafluoropropene-tetrafluoroethylenemethyl perfluorovinyl ether quaternary copolymer, tetrafluoroethylene-n-butyl perfluorovinyl ether-perfluoro(methyl vinyl ether) terpolymer, vinylidene fluoride-n-butyl perfluorovinyl ether copolymer, tetrafluoroethylene-propylene-n-butyl perfluorovinyl ether terpolymer, tetrafluoroethylenevinylidene fluoride-propylene-n-butyl perfluorovinyl ether quaternary copolymer, etc.

Polymerization reaction of fluorine-containing olefins or fluorine-containing olefins with the comonomers above mentioned is carried out by a so far well known method, for example, solution polymerization, suspension polymerization or emulsion polymerization.

When the polymerization reaction is carried out in the presence of an iodine and bromine-containing compound, an iodine-containing compound or a bromine-containing compound, iodine and/or bromine is introduced into the fluorine-containing olefin copolymers to form crosslinking points for the organic peroxide crosslinking.

The iodine and bromine-containing compound is saturated or unsaturated linear or aromatic compounds represented by the general formula:

$$RBr_nI_m$$

wherein R is a fluorohydrocarbon group, chlorofluoro hydrocarbon group, chlorohydrocarbon group or hydrocarbon group and n and m are 1 or 2 and preferably n and m are each 1. The linear iodine and bromine-containing compound for use in the present invention includes, for example, 1-bromo-2-iodoperfluoroethane, 1-bromo-3-iodoperfluoropropane, 1-bromo-4-iodoperfluorobutane, 2-bromo-3-iodoperfluorobutane, 3,4-dibromo-1-iodo-1,1,2,2,4,4-hexafluorobutane, 3-bromo-4-iodoperfluorobutene-1, 2-bromo-4-iodoperfluorobutene-1, etc. The aromatic iodine and bromine-containing compound for use in the present invention includes, for example, monoiodomonobromo-substituted benzenes, diiodomonobromo-substituted benzenes, monoiododibromo-substituted benzenes, (2-iodoethyl) and (2-bromoethyl)-substituted benzenes, etc. at various substitution positions. These iodine and bromine-containing compounds generally combine with the fluorine-containing olefin copolymers at the molecule terminals to give fluorine-containing elastomers capable of efficiently making the crosslinking. To this end, about 0.001 to about 5% by weight, preferably about 0.01 to about 3% by weight, of the iodine and bromine-containing compound in terms of iodine and bromine is made to combine with the fluorine-containing olefin copolymers.

As the iodine-containing compound, aromatic compounds or perfluoroaromatic compounds polysubstituted with iodine atoms or iodoalkyl groups, for example, iodoethyl group, are used in a combining ratio of about 0.001 to about 5% by weight, preferably about 0.001 to about 3% by weight, in terms of the iodine in the fluorine-containing elastomer or iodo-substituted, saturated or unsaturated aliphatic hydrocarbons, fluoroaliphatic hydrocarbons or chlorofluoroaliphatic hydrocarbons are used in a combining ratio of about 0.001 to about 10% by weight in terms of the iodine in the fluorine-containing elastomer.

As the bromine-containing compound, aromatic compounds or perfluoroaromatic compounds polysubstituted with bromine atoms or bromoalkyl groups, for example, bromoethyl group, are used in a combining ratio of about 0.001 to about 5% by weight, preferably about 0.01 to about 3% by weight, in terms of the bromine in the fluorine-containing elastomer, or bromine-substituted saturated aliphatic hydrocarbons are used in a combining ratio of about 0.001 to about 10% by weight in terms of the bromine in the fluorine-containing elastomer, or bromine-containing olefins are used in a combining ratio of about 0.05% by weight or more, generally about 0.3 to about 1.5% by weight, in terms of the bromine in the fluorine-containing elastomer. Furthermore, 3- or 2-bromoperfluoropropyl perfluorovinyl ether, etc. can be also used.

The fluorine-containing elastomers containing iodine and/or bromine in the molecule, obtained by combining the fluorine-containing copolymers with these iodine and bromine-containing compounds, bromine compounds or iodine compounds have a peroxy group represented by the general formula $-O-O-C(CH_3)_2R$ in the molecules and are crosslinked with an organic peroxide having an activation energy of not more than 34.0 Kcal/mole.

The organic peroxide for use in the present invetion includes, the following compounds each with the following activation energy (unit: Kcal/mole).

| Organic peroxide | Compound name | Activation energy |
|---|---|---|
| A | n-butyl-4, 4-bis(t-butylperoxy)-valerate | 33.9 |
| B | 1, 1-bis(t-butylperoxy)-3, 3, 5-trimethylcyclohexane | 33.2 |
| C | 1, 1-bis(α, α-dimethylbutylperoxy)-cyclohexane | 32.2 |
| D | 1, 1-bis(α, α-dimethylbutylperoxy)-3, 3, 5-trimethylcyclohexane | 31.8 |
| E | t-butylperoxy-3, 3, 5-trimethylhexanoate | 30.3 |

Besides the foregoing compounds, the following organic peroxides can be used.
t-butylperoxyisopropylcarbonate,
t-butylperoxylaurate,
t-butylperoxyisobutyrate,
t-butylperoxy(2-ethylhexanoate),
t-hexylperoxyneohexanoate,
t-butylperoxypivalate,
t-butylperoxymaleate and
1,1-bis(t-butylperoxy)cyclohexane On the other hand, organic peroxides not to be used in the present invention because of higher activation energy than 34.0 Kcal/mole, though they have an $-O-O-C(CH_3)_2R'$ group, wherein R' is a lower alkyl group or (substituted) phenyl group in the molecule, include, for example, the following compounds.

| Organic peroxide | Compound name | Activation energy |
|---|---|---|
| F | dicumyl peroxide | 40.6 |
| G | α, α-bis(t-butylperoxy-m-isopropyl)-benzene | 39.2 |
| H | 2, 5-dimethyl-2, 5-di(t-butylperoxy)-hexine-3 | 36.7 |
| I | 2, 5-dimethyl-2, 5-di(t-butylperoxy)-hexane | 36.3 |

Organic peroxides not to be used in the present invention because they have no such $-O-O-C(CH_3)_2R$ group in the molecules, though they have an activation energy of not more than 36.0 Kcal/mole, include, for example, the following compounds.

| Organic peroxide | Compound name | Activation energy |
|---|---|---|
| J | benzoyl peroxide | 31.1 |
| K | lauroyl peroxide | 30.4 |

A crosslinkable, fluorine-containing elastomer composition according to the present invention is prepared by adding about 0.1 to about 10 parts by weight, preferably about 0.5 to about 5 parts by weight, of the specific organic peroxide or its master batch to 100 parts by weight of iodine and/or bromine-containing, fluorine-containing elastomer, followed by mixing by an ordinary mixing method, for example, by roll mixing, kneader mixing, Bambury mixing, solution mixing, etc.

It is desirable to add to the composition about 0.1 to about 15 parts by weight, preferably about 2 to about 10 parts by weight, of a polyfunctional compound capable of improving the mechanical strength, compression set, etc. such as tri(meta)allyl isocyanurate, tri(meta)allyl cyanurate, triallyl trimellitate, N,N'-m-phenylenebismaleimide, diallyl phthalate, tris(diallylamine)-s-triazine, triallyl phosphite, (di)ethyleneglycol diacrylate, neopentylglycol diacrylate, etc. per 100 parts by weight of the fluorine-containing elastomer. If necessary, other additives such as a filler, a reinforcing agent, a plasticizer, a lubricant, a processing aid, a pigment, etc. can be appropriately added to the composition.

Crosslinking of the composition is generally carried out through a primary crosslinking at about 100° to about 250° C. for 1 to 120 minutes and a secondary crosslinking at about 150° to about 300° C. for 0 to 30 hours according ls one-minute half-life temperature of the organic peroxide used.

When fluorine-containing elastomers further containing iodine and/or bromine in the molecules are crosslinked with an organic peroxide by heating, generation of toxic gases such as methyl iodide, methyl bromide, etc. in inevitable, but the amount of the toxic gases to be generated can be effectively lowered by selectively using an organic peroxide having a specific peroxy group in the molecule and an activation energy of not more than 34.0 Kcal/mole.

When an organic peroxide having a specific peroxy group but an activation energy of more than 34.0 Kcal/mole on one hand, the amount of the toxic gases to be generated is increased, and when an organic peroxide having no specific peroxy group is used on the other hand, though its activation energy is not more than 34.0 Kcal/mole, the generation of toxic gases can be very effectively suppressed, but foaming, etc. take place, resulting in a failure to form useful, vulcanization-shapable rubber.

As a result of detailed study of corelationships between the structure and activation energy of organic peroxide to be used and the amount of highly toxic methyl iodide, methyl bromide, etc. to be generated, the present inventors have established the present invention, which is very effective for preventing the environmental pollution.

The present invention will be described below, referring to Examples.

REFERENCE EXAMPLE 1,500 ml of deionized water and 7.5 g of ammonium perfluorooctanoate were charged into an autoclave having a net capacity of 3 liters, and the inside space of the autoclave was thoroughly flushed with a gas mixture of vinylidene fluoride/hexafluoropropene/tetrafluoroethylene in a ratio by mole of 42/38/20. Then, the inside pressure was increased to 12 kg/cm$^2$ gauge with this gas mixture, and then 4.0 g of 1-bromo-2-iodoperfluoroethane was injected therein. The inside temperature was increased to 80° C. with stirring, where the inside pressure reached 16 kg/cm$^2$ gauge.

Then, 0.5 g of ammonium persulfate dissolved in 20 ml of deionized water was added thereto to initiate the polymerization reaction. Since the inside pressure was decreased as the reaction advanced, and when the inside pressure was lowered down to 15 kg/cm$^2$ gauge, it was again increased to 16 kg/cm$^2$ gauge with a gas mixture of vinylidene fluoride/hexafluoropropene/tetrafluoroethylene in a ratio by mole of 58/20/22. The polymerization was likewise continued under a pressure between 15 and 16 kg/cm$^2$ gauge, and 24 hours thereafter, the unreacted gas mixture was purged from the autoclave to discontinue the polymerization reaction.

Then, an aqueous 5 wt. % potassium alum solution was added to the thus obtained aqueous emulsion to coagulate the formed polymers, followed by water washing and drying, and 468 g of rubbery polymers were obtained.

EXAMPLE

Fluorine-containing elastomer I: iodine and bromine-containing, fluorine-containing elastomer, rubbery copolymer of Reference Example Fluorine-containing elastomer II: bromine-containing, fluorine-containing elastomer, Viton GF, a product made by E. I DuPont, U.S.A.

Fluorine-containing elastomer III: iodine-containing, fluorine-containing elastomer, Daiel G-902, a product made by Daikin K. K., Japan A mixture of 100 parts by weight of one of the elastomers, 20 parts by weight of MT carbon black, 1.5 parts by weight of 2,5-dimethyl-2,5-di(t-butylperoxy)hexane or other organic peroxide corresponding to the active oxygen amount of the 2,5-dimethyl-2,5-di(t-butylperoxy)hexane, 3 parts by weight of lead oxide and 4 parts by weight of triallyl isocyanurate was kneaded through rolls.

Then, 30 to 40 mg of the resulting kneaded mixture was placed in a pyrolysis furnace and decomposed at a one-minute half-life temperature of the organic peroxide used for 20 minutes to quantitatively determine the generated gases by gas chromatography(QP-100 GC-MS, trademark of a product made by Shimazu Seisakusho K. K., Japan). The results are shown in the following Table as ratios of the amount of CH$_3$I and that of CH$_3$Br generated with other organic peroxide to the amount of CH$_3$I and that of CH$_3$Br generated with 2,5-dimethyl-2,5-di(t-butylperoxy)hexane now used in the most popular manner, respectively. In the following Table, an ODR torque value (unit: kg. cm) is given together.

TABLE

| Case | Fluorine-containing elastomer | Organic peroxide | ODR torque value | CH$_3$I ratio | CH$_3$Br ratio |
| --- | --- | --- | --- | --- | --- |
| Example 1 | I | A | 6.8 | 0.92 | 0.53 |
| Example 2 | " | B | 6.1 | 0.97 | below detection limit |
| Example 3 | I | C | 7.2 | 0.004 | below detection limit |
| Example 4 | " | D | 7.4 | 0.01 | below detection limit |

TABLE-continued

| Case | Fluorine-containing elastomer | Organic peroxide | ODR torque value | CH$_3$ I ratio | CH$_3$ Br ratio |
|---|---|---|---|---|---|
| Example 5 | " | E | 8.4 | 0.52 | below detection limit |
| Comp. Ex. 1 | " | F | 8.6 | 1.69 | 1.76 |
| Comp. Ex. 2 | " | G | 6.9 | 1.48 | 1.19 |
| Comp. Ex. 3 | " | H | 8.2 | 1.06 | 1.04 |
| Comp. Ex. 4 | " | I | 9.8 | 1.00 | 1.00 |
| Comp. Ex. 5 | " | J | 6.9* | Below detection limit | Below detection limit |
| Comp. Ex. 6 | I | K | 7.2* | Below detection limit | Below detection limit |
| Example 6 | II | C | 6.2 | — | Below detection limit |
| Comp. Ex. 7 | II | I | 7.1 | — | 1.00 |
| Comp. Ex. 8 | " | K | 6.1* | — | Below detection limit |
| Example 7 | III | C | 11.1 | 0.09 | — |
| Comp. Ex. 9 | " | I | 12.2 | 1.00 | — |
| Comp. Ex. 10 | " | J | 9.8* | Below detection limit | — |
| Comp. Ex. 11 | III | K | 9.8* | Below detection limit | — |

Note:
*means occurrence of foaming

What is claimed is:

1. A crosslinkable, fluorine-containing elastomer composition which comprises a fluorine-containing elastomer containing iodine and bromine at the molecule terminals and an organic peroxide having a peroxy group represented by the general formula —O—O—C(CH$_3$)$_2$R, where R is a lower alkyl group, in the molecule and an activation energy of not more than 34.0 Kcal/mole.

2. A crosslinkable, fluorine-containing elastomer composition according to claim 1, wherein the fluorine-containing elastomer containing iodine and bromine at the molecule terminals is a fluorine-containing olefin copolymer obtained by polymerization reaction of fluorine-containing olefins in the presence of a saturated linear or aromatic compound represented by the general formula RBr$_n$I$_m$, wherein R is a fluorohydrocarbon group, a chlorofluorohydrocarbon group, a chlorohydrocarbon group or a hydrocarbon group and n and m are 1 or 2.

3. A crosslinkable, fluorine-containing elastomer composition according to claim 2 wherein the fluorine-containing elastomer containing at least one of iodine and bromine is contained at least one of iodine and bromine in a combining ratio of 0.001 to 3% by weight.

4. A crosslinkable, fluorine-containing elastomer composition according to claim 1, wherein 0.1 to 10 parts by weight of the organic peroxide is contained per 100 parts by weight of the fluorine-containing elastomer containing at least one of iodine and bromine.

5. A crosslinkable, fluorine-containing elastomer composition according to claim 1, wherein 0.1 to 15 parts by weight of a polyfunctional compound is further contained per 100 parts by weight of the fluorine-containing elastomer containing at least one of iodine and bromine.

* * * * *